(12) United States Patent
Goyal et al.

(10) Patent No.: US 11,748,861 B2
(45) Date of Patent: Sep. 5, 2023

(54) ENHANCING RESOLUTION AND CORRECTING ANOMALIES OF REMOTE SENSED DATA

(71) Applicant: International Business Machines Corporation, Armonk, NY (US)

(72) Inventors: Aanchal Goyal, Patparganj (IN); Ranjini B. Guruprasad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 17/120,434

(22) Filed: Dec. 14, 2020

(65) Prior Publication Data

US 2021/0097663 A1 Apr. 1, 2021

Related U.S. Application Data

(63) Continuation of application No. 16/119,223, filed on Aug. 31, 2018, now Pat. No. 10,916,002.

(51) Int. Cl.
*G06K 9/00* (2022.01)
*G06T 5/50* (2006.01)
*G06T 5/00* (2006.01)
*G06T 7/00* (2017.01)
*G06T 3/40* (2006.01)

(52) U.S. Cl.
CPC .......... *G06T 5/50* (2013.01); *G06T 3/40* (2013.01); *G06T 5/003* (2013.01); *G06T 5/005* (2013.01); *G06T 7/0016* (2013.01); *G06T 2207/10036* (2013.01); *G06T 2207/10048* (2013.01); *G06T 2207/20221* (2013.01); *G06T 2207/30188* (2013.01)

(58) Field of Classification Search
None
See application file for complete search history.

(56) References Cited

U.S. PATENT DOCUMENTS

| | | |
|---|---|---|
| 2011/0055220 A1 | 3/2011 | Tyburski |
| 2017/0011089 A1 | 1/2017 | Bermudez Rodriguez et al. |
| 2018/0139431 A1* | 5/2018 | Simek .................. H04N 13/254 |
| 2018/0164762 A1* | 6/2018 | Mewes .................. A01G 25/16 |
| 2019/0230875 A1 | 8/2019 | Mewes et al. |

OTHER PUBLICATIONS

List of IBM Patents or Patent Applications Treated as Related, dated Dec. 14, 2020, 2 pages.

* cited by examiner

*Primary Examiner* — Wei Wen Yang
(74) *Attorney, Agent, or Firm* — Scully, Scott, Murphy & Presser, P.C.; Stosch Sabo

(57) ABSTRACT

A virtual satellite system may receive, re-project to a spatial resolution and interpolate to a desired temporal resolution, georeferenced data representing an image of a geographic region from a plurality of different satellites. Bias in the georeferenced data between the plurality of satellites is determined and based on which satellite's image data contains an identified minimum spatial resolution, vegetation index data may be set to one of the satellite's data, which may or may not be adjusted. A target image may be generated based on the set vegetation index data.

20 Claims, 6 Drawing Sheets

ENHANCING RESOLUTION AND CORRECTING ANOMALIES OF REMOTE SENSED DATA

BACKGROUND

The present disclosure relates generally to computers, and computer applications, and more particularly to computer-implemented image processing, for example, of satellite generated images.

Satellites can provide images of Earth's surface, which are used in many applications. For instance, the Landsat and MODIS satellites have been providing spectacular imagery of Earth's surface for over 40 years and 20 years respectively. Joining them is another recent initiative by European Space Agency (ESA) of multispectral Sentinel satellites first launched in 2016. These satellites together can provide a variety of vegetation indices, in particular, Normalized Difference Vegetation Index (NDVI) which is adopted to analyze vegetation patterns and crop phenological characteristics to understand and predict expected yield, pest attacks, water deficiency, and others. A challenge, however, in using the data from multiple satellites to derive common integrated insight is that the spatial and temporal resolutions do not match across various satellites.

In another aspect, satellite data is available at low temporal and/or spatial resolution and is affected by atmospheric interference and cloud cover. While drones with specialized near-infrared (NIR) cameras and corresponding image processing algorithms can also identify crop growth stages, drones generally require technical expertise, high operating expense and investment, and permission from local authorities to operate.

BRIEF SUMMARY

In aspects, a virtual satellite apparatus and method may be provided, which correct data anomalies of remote sensed data and enhances temporal and spatial resolution, for instance, to estimate high spatio-temporal resolution vegetation indices termed as High Definition Normalized Difference Vegetation Index (HD-NDVI).

A virtual satellite system, in one aspect, may include a hardware processor coupled with a communication interface, a memory coupled to the hardware processor, and a blending algorithm executable on the hardware processor. An application programming interface executing on the hardware processor, responsive to being invoked, may trigger the blending algorithm executing on the hardware processor. The blending algorithm executing on the hardware processor, in one aspect, may receive data corresponding to a historical time window and representing a time series of images of a geographic region from a plurality of satellites, at least some of which acquire images at different spatial resolutions from one another. The blending algorithm executing on the hardware processor, in one aspect, may identify a first satellite that has a minimum (finest but minimum in value) of the spatial resolutions of the plurality of satellites. The blending algorithm executing on the hardware processor, in one aspect, may re-project the data of the plurality of satellites except the first satellite to the minimum spatial resolution identified in the first satellite. The blending algorithm executing on the hardware processor, in one aspect, may remove cloud data, if present, from the data of the first satellite and from the re-projected data of remaining satellites of the plurality of the satellites. The blending algorithm executing on the hardware processor, in one aspect, may interpolate the data of the first satellite and the re-projected data of the remaining satellites to a desired temporal resolution, for the data not already having the desired temporal resolution. The blending algorithm executing on the hardware processor, in one aspect, may determine pairwise bias between the data of the first satellite, which is possibly interpolated and cloud corrected, and the re-projected data, which is possibly interpolated and cloud corrected, of each one of the remaining satellites, wherein a bias time series is generated. The blending algorithm executing on the hardware processor, in one aspect, may smoothen the bias time series. The blending algorithm executing on the hardware processor, in one aspect, may determine whether the first satellite data is present for a given time. The blending algorithm executing on the hardware processor, in one aspect, may, responsive to finding that the first satellite data is present, set vegetation index data to the first satellite's data. The blending algorithm executing on the hardware processor, in one aspect, may, responsive to finding that the first satellite data is absent and responsive to finding that a next minimum spatial resolution satellite data is present among the remaining satellites, set vegetation index data to a next minimum spatial resolution satellite's data adjusted by the bias estimated between the next minimum spatial resolution satellite's data and the first satellite's data. In one aspect, the blending algorithm executing on the hardware processor determines the pairwise bias, determines whether the first satellite data is present, and sets the vegetation index data, for each of the pixels of the time series of images. The blending algorithm executing on the hardware processor, in one aspect, may generate a target image comprising pixels represented by the set vegetation index data.

A computer-implemented method, in one aspect, may include receiving data corresponding to a historical time window and representing a time series of images of a geographic region from a plurality of satellites, at least some of which acquire images at different spatial resolutions from one another. The method may also include identifying a first satellite that has a minimum of the spatial resolutions of the plurality of satellites. The method may also include re-projecting the data of the plurality of satellites except the first satellite to the minimum spatial resolution identified in the first satellite. The method may also include removing cloud data, if present, from the data of the first satellite and from the re-projected data of remaining satellites of the plurality of the satellites. The method may also include interpolating the data of the first satellite and the re-projected data of the remaining satellites to a desired temporal resolution, for the data not already having the desired temporal resolution. The method may also include determining pairwise bias between the data, possibly interpolated and cloud corrected, of the first satellite and the re-projected data, possibly interpolated and cloud corrected, of each one of the remaining satellites, wherein a bias time series is generated. The method may also include smoothing the bias time series. The method may also include determining whether the first satellite data is present for a given time. The method may also include, responsive to finding that the first satellite data is present, setting vegetation index data to first satellite's vegetation index data. The method may also include, responsive to finding that the first satellite data is absent and responsive to finding that a next minimum spatial resolution satellite data is present among the remaining satellites, setting vegetation index data to a next minimum spatial resolution satellite's data adjusted by the bias estimated between the next minimum spatial resolution satellite's data and the first satellite's data. The determining of the pairwise bias, determining whether the first satellite data is present, and setting the vegetation index data may be performed for each of the pixels of the time series of images. The method may also include generating a target image comprising pixels represented by the set vegetation index data.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
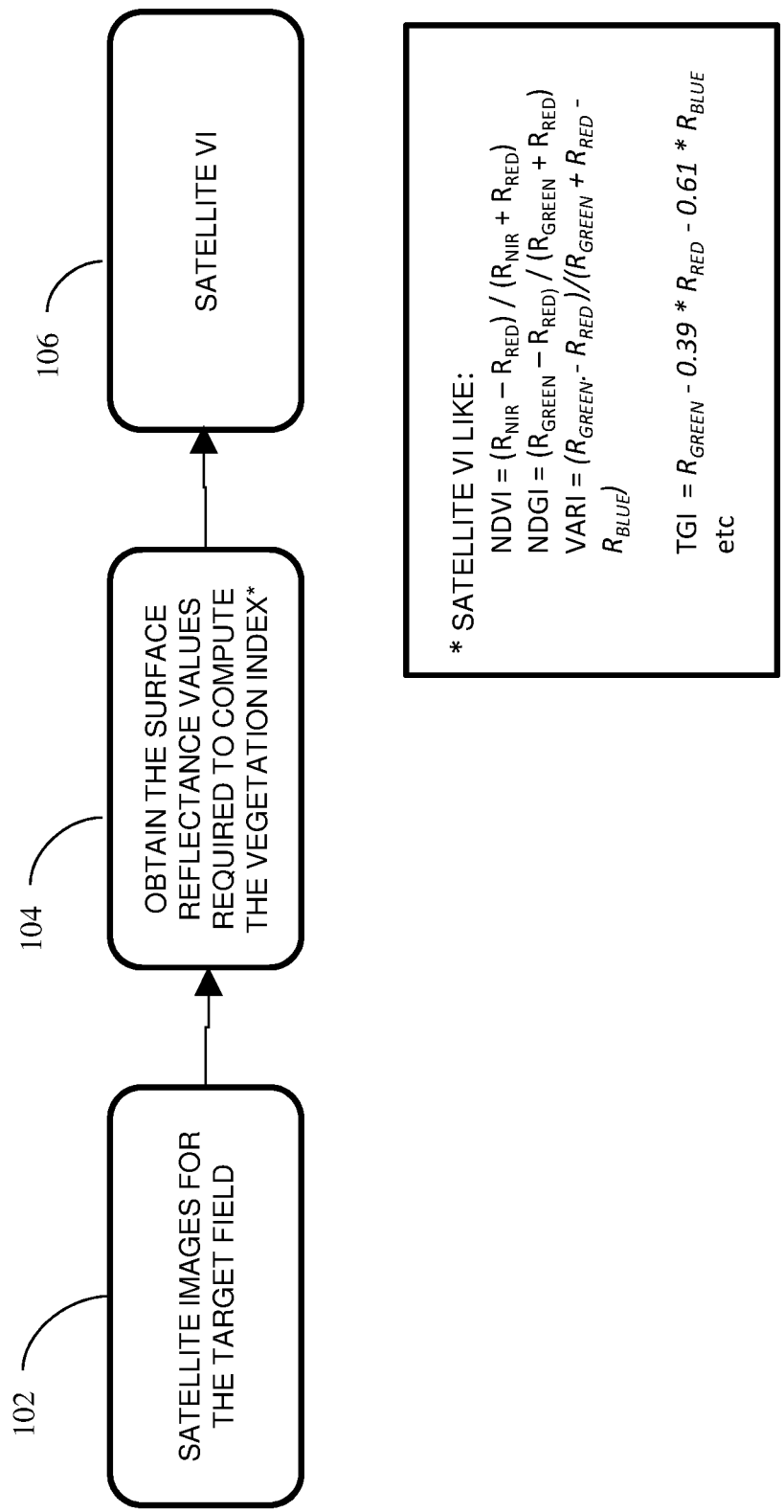
FIG. 1 is a flow diagram illustrating a method in one embodiment of estimating satellite vegetation index.

A system, method, computer program product and techniques in some embodiments provide a blending algorithm, which brings together remote sensed data from a plurality of satellites (e.g., aforementioned satellites) and derive high spatial and temporal resolution NDVI termed High Definition Normalized Difference Vegetation Index (HD-NDVI) at the fine spatial resolution of that satellite data, which has the minimum (finest but minimum in value) spatial resolution among the plurality of satellites and the finest (e.g., daily) temporal resolution.

Briefly, spatial resolution refers to the size of a pixel. For instance, an image with spatial resolution of 10 meters means that one pixel on the image represents an area or region of 10 by 10 meters on the ground, for example, Earth's surface. Temporal resolution refers to the frequency of visits or how often a satellite visits the same area or region (e.g., collect data of that region), for instance, the time between two subsequent data acquisitions of an area. In the present disclosure, high spatial resolution or minimum spatial resolution refers to the finest resolution available, for instance, among the data of the plurality of satellites being considered. For instance, among spatial resolutions of 10 meters (m), 30 meters (m) and 250 meters (m), the 10-meter spatial resolution is considered the finest or minimum spatial resolution. Then the 30-meter spatial resolution is considered to be the next finest or next minimum spatial resolution, and the 250-meter spatial resolution considered the next finest or next minimum spatial resolution, and so on until all satellites are considered. In the present disclosure, high temporal resolution (which is also referred to as minimum temporal resolution) refers to the finest temporal resolution available, for instance, among the data of the plurality of satellites being considered. For instance, among temporal resolutions of 1-day, 5-days and 16-days, the 1-day temporal resolution is considered the finest or minimum temporal resolution, the 5-days temporal resolution considered to be the next finest or next minimum, and the 16-days temporal resolution considered to be the next finest or next minimum temporal resolution, and so on until all satellites are considered.

For example, Sentinel satellite(s) can provide data of 10-60 meter (m) spatial resolution (e.g., pixel size 10 m×10 m) with temporal resolution of 5-12 days. Currently, Sentinel satellite(s) are considered to provide data of the finest (minimum) spatial resolution available. Landsat satellite can provide data of 30 meter spatial resolution (e.g., 30 m×30 m pixel size) with temporal resolution of 16 days. MODIS satellite can provide data of 250 meter spatial resolution (e.g., 250 m×250 m pixel size) with temporal resolution of 1 day (daily temporal resolution). Currently, MODIS satellite is considered to provide data of the finest (minimum) temporal resolution.

In some embodiments, the algorithm in the present disclosure analyzes past observed and current NDVI data from a plurality of satellites (e.g., three satellites or more), identifies the satellite with the minimum (finest but minimum in value) spatial resolution in the plurality of satellites, performs spatial re-projection data of all satellites with spatial resolution greater than minimum spatial resolution to the minimum (finest but minimum in value) spatial resolution, corrects for anomalous data due to cloud cover or the like for each of the individual satellites, interpolates to achieve the desired temporal frequency, determines the pairwise bias between corrected satellite data of all satellites which have spatial resolution greater than the minimum (finest but minimum in value) spatial resolution satellite and the satellite data of the satellite which has the minimum (finest but minimum in value) spatial resolution, smoothens the bias and applies the smoothened bias correction to all the satellite data which have spatial resolution greater than that of the satellite that has the minimum spatial resolution to derive the HD-NDVI. HD-NDVI thus acts as a virtual satellite that has the best possible of temporal and spatial resolutions, for example, compared to the widely adopted Landsat, Sentinel and MODIS satellites. This technique can be used to create other high (finest) resolution satellite derived vegetation indices as well in a similar fashion from multiple data sources. For example, the system, method computer program product and techniques in some embodiments enhance temporal and spatial resolution and correct data anomalies of remote sensed data, for instance, for estimating high spatio-temporal resolution vegetation indices.

Briefly, the normalized difference vegetation index (NDVI) refers to a graphical indicator that can be used to analyze remote sensing measurements, for example, from a space platform, and assess vegetated areas and their conditions, for example, whether the target being observed (e.g., corresponding to the remote sensing measurements) contains live green vegetation or not. NDVI quantifies vegetation health by estimating the difference between near-infrared (NIR) and red (Red) band reflectance normalized by the sum of NIR and Red band reflectance as measured by satellites.

Remote sensing in agriculture is a rapidly growing field and there is an increase in the need for identifying crop growth stage and its analysis to ensure a healthy crop cycle. Vegetation indices like NDVI, soil-adjusted vegetation index (SAVI), modified soil-adjusted vegetation index (MSAVI) are used to monitor crop growth by utilizing reflectance values of various spectral bands from remote sensed satellite data.

In some embodiments, the system and method derives a high (finest) spatial and temporal resolution anomaly corrected vegetation index with daily (or periodic) temporal resolution and spatial resolution equal to the minimum (finest but minimum in value) of all the spatial resolutions of input satellite data. The system and method in some embodiments obtain current and historical satellite imagery for a historical time window for the plurality of satellites. The system and method in some embodiments re-projects the spatial resolution of all the satellite images with spatial resolution greater than that of the minimum spatial resolution to the minimum (finest but minimum in value) spatial resolution. If there are a plurality of satellites with minimum spatial resolution, the system and method in some embodiments selects that satellite with the minimum (finest but minimum in value) spatial and temporal resolution. The system and method in some embodiments interpolate re-projected satellite data and also that of the satellite with minimum spatial resolution to the required time resolution. The system and method correct for anomalous data due to cloud occlusion or sensor saturation or defective pixels or missing values. The system and method may also extrapolate data for a period (e.g., days) when no satellite is in the target area to gather data. The system and method in some embodiments derive the pairwise bias between data from multiple satellites using historical time series to enable blending of data from multiple sources. The system and method in some embodiments smoothen the bias time series so obtained. For a given day, the system and method in some embodiments selects the satellite with the minimum resolution and sets the vegetation index data to that of the satellite with minimum (finest but minimum in value) resolution. If satellite with minimum (finest but minimum in value) resolution is not present, then the satellite with the next minimum spatial resolution is selected and corrected for bias and the vegetation index data is set to that of the bias corrected satellite vegetation index. If the satellite selected is the one with minimum spatial resolution and has temporal resolution higher (coarser but higher in value) than what is desired, then the system and method in some embodiments interpolate the data to the required or desired temporal resolution (finer and lower in value). In case the satellite selected has missing data, the system and method in some embodiments interpolate the data to fill in the missing data. If the satellite data selected is of the required or desired temporal resolution and there is no missing data, then the system and method in some embodiments skip interpolation.

In some embodiments, the system and method ingest and blend spectral images from multiple satellites (e.g., greater than two images) in one run of the algorithm to provide best temporal and spatial resolution across all input satellites. The system and method in some embodiments can handle more than two satellites at a time.

In some embodiments, the system and method generate high resolution images even for the days when both low (coarser) resolution and high (finer) resolution satellite images are absent. For instance, the system and method need not have an image to be present on the day of prediction.

To account for the land-cover and land-use (LCLU) changes that may have occurred between the same satellite images, the system and method in some embodiments, capture information from all spectral images and blend to create HD-NDVI (or another vegetation indices) at daily (or periodic) resolution.

The system and method of the present disclosure in some embodiments can, for example, estimate vegetation indices for a field on days when satellite data is not available or has cloud cover, perform growth stage identification, identify pest attacks, estimate crop yield, and identify water deficiency in crops.

FIG. 1 is a flow diagram illustrating a method in one embodiment of estimating satellite vegetation index. At 102, satellite images for the target field is received or obtained. For instance, pixel data associated with the satellite images are obtained. At 104, values associated with vegetation index are determined. For instance, the following computation may be performed to obtain various vegetation indices.

$$NDVI = (R_{NIR} - R_{RED})/(R_{NIR} + R_{RED})$$

$$\text{Normalized Difference Greeness Index (NDGI)} = (R_{GREEN} - R_{RED})/(R_{GREEN} + R_{RED})$$

$$\text{Visible Atmospheric Resistant Index (VARI)} = (R_{GREEN} - R_{RED})/(R_{GREEN} + R_{RED} - R_{BLUE})$$

$$\text{Visible Band Index } (TGI) = R_{GREEN} - 0.39 * R_{RED} - 0.61 * R_{BLUE}$$

Various vegetation indices are defined above. In the above computations, $R_{NIR}$ represent surface reflectance measurements acquired in the near-infrared regions and $R_{RED}$ represent the surface reflectance measurements acquired in the red (visible) regions. $R_{GREEN}$ is surface reflectance of green band, and $R_{BLUE}$ is surface reflectance of blue band in the visible spectrum. Surface reflectance is defined as the ratio of the reflected radiation to incident radiation and is in the range between 0 and 1.

At 106, the computation performed at 104 results in satellite vegetation index. For example, the satellite images of a plurality of satellites for the region of interest and period of interest are obtained as shown in 102. The surface reflectance values of pixels of the bands of interest are obtained from the satellite images and vegetation indices are computed at 104. 106 represents the vegetation indices so obtained.

Figure 2:
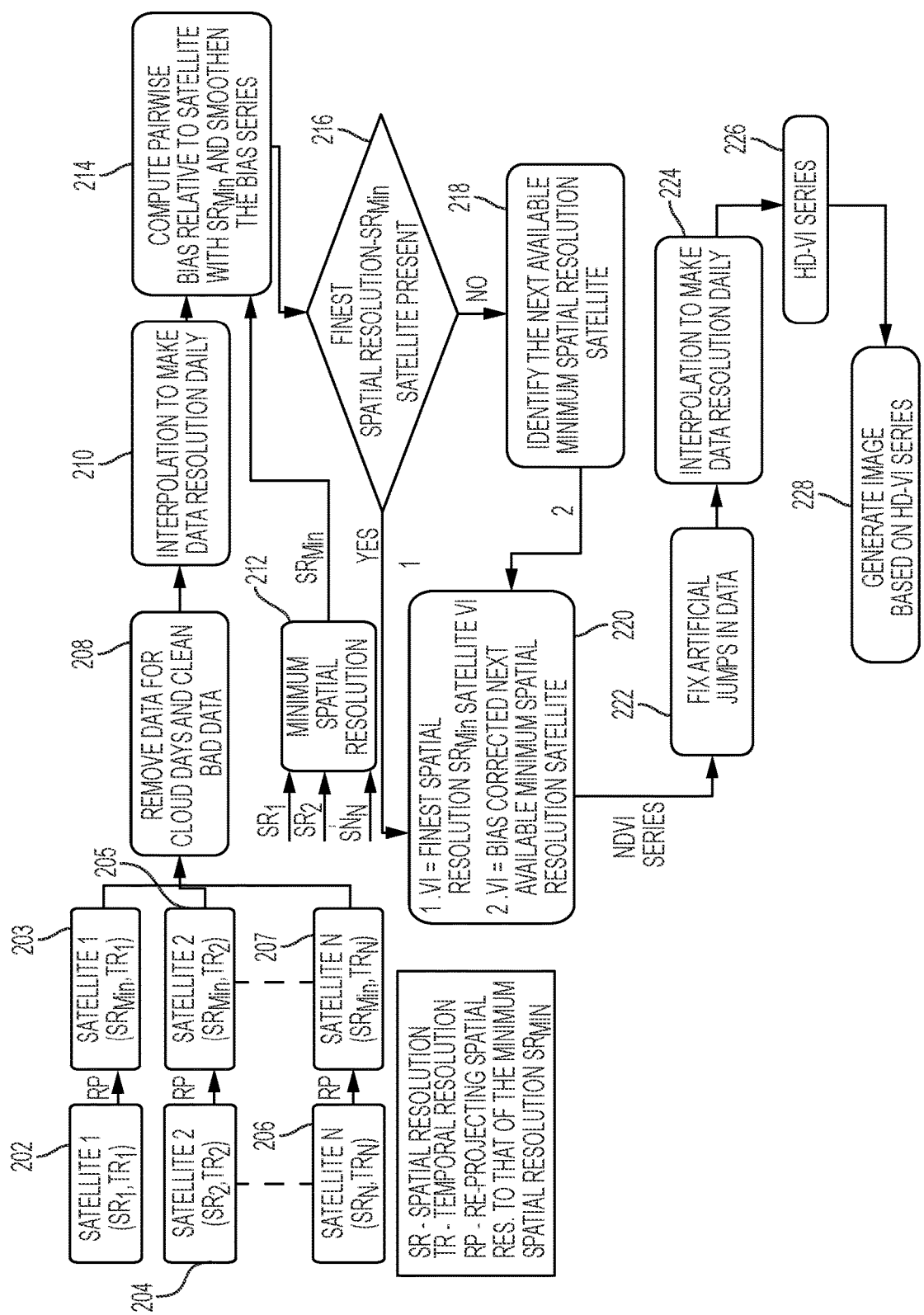
FIG. 2 is a diagram illustrating a logic flow of a high definition vegetation index module in one embodiment.

FIG. 2 is a diagram illustrating a logic flow of a high definition (finest spatial and temporal resolution) vegetation index module in one embodiment in the present disclosure. A plurality of satellite vegetation index data (e.g., computed as shown in FIG. 1), for example, from more than 2 satellites is received. For instance, spatial resolution (SR) and temporal resolution (TR) data associated with surface reflectance measurements of a target region taken from satellite 1 202, satellite 2 204 . . . , and satellite N 206 can be known by studying the characteristics of satellite data. The period of interest over which the satellite vegetation index is considered, in some embodiments, corresponds to the period of past data, which can be used to calculate bias as will be described below, and is termed as the historical time window. The pixel values for the historical time window results in a time series of vegetation index for that pixel. An example of a historical time window may be 90 days. Other periods can be considered.

Spatial resolution refers to the surface area measured on the ground (e.g., target field) and is represented by size of an individual pixel in satellite imagery. Temporal resolution refers to the amount of time, e.g., expressed in days, which elapses before a satellite revisits a particular point on the Earth's surface. For instance, a satellite may have a revisit time of 5 days or may come every day.

At 203, the satellite 1 data 202 is re-projected with respect to the spatial resolution to that of the minimum (finest but minimum in value) spatial resolution, $SR_{Min}$. Given the plurality of satellites that are considered for computing the HD-NDVI, $SR_{Min}$ corresponds to that satellite which has the minimum (finest but minimum in value) spatial resolution. The satellite imagery which has $SR>SR_{Min}$ is sampled at all spatial points characterized by latitude and longitude to re-project the coarser resolution satellite data to spatial resolution $SR_{Min}$. For instance, re-projected data may have multiple pixels covering the area covered by the single bigger pixel of the original data before spatial re-projection. Such multiple pixels would be assigned the same value as that of the original single bigger pixel that was covering the area before spatial re-projection. Similarly to defining minimum spatial resolution, highest temporal resolution may be defined in some embodiments as the minimum of the temporal resolution of all satellites. In some embodiments, the highest (finest but minimum in value) temporal resolution can be fixed to 1 day and the satellite vegetation index time series is interpolated, if TR>1 day, to derive daily temporal time series of the vegetation index. However, the present disclosure does not limit the methodology to the temporal value of 1 day as the highest (finest) value. Rather, other highest (finest but minimum in value) temporal value may be contemplated.

Similarly at 205, the satellite 2 data 204 is spatially re-projected to the minimum (finest but minimum in value) spatial resolution, $SR_{Min}$. Likewise, at 207, the satellite 3 data 206 is spatially re-projected to the minimum (finest but minimum in value) spatial resolution, $SR_{Min}$. In one aspect, if a satellite's data already has the minimum resolution, that satellite's data need not be re-projected.

At 208, data cleansing of the received data (e.g., 202, 204, 206) and/or re-projected data (e.g., if the data is re-projected, e.g., 203, 205, 207) may be performed, for instance, by removing data associated with cloud cover. Other noise data such as other atmospheric interference data or another may be removed or corrected. For example, a pixel quality index also obtained with the satellite data provides for auxiliary information associated with each pixel, for instance, whether that pixel data represents cloud, snow, vegetation or another attribute. Using the pixel quality index, data that represents cloud cover or any other unwanted data may be removed. Other noise data may be removed, for example, based on the identification by the pixel quality index. Other methods may be employed to identify unwanted or "bad" data and hence remove that data.

At 210, the data is interpolated to render the data to have a predetermined temporal resolution, for example, daily resolution. For instance, linear interpolation may be performed between time series data of the satellites.

At 212, based on the spatial resolution data associated with each of the satellites being considered (e.g., satellite 1, satellite 2, . . . , and satellite N), the minimum (finest but minimum in value) spatial resolution ($SR_{Min}$) is identified in the data.

At 214, a pairwise bias is computed relative to a given satellite with $SR_{Min}$ (the satellite that has the finest spatial resolution, e.g., identified at 212). In addition, in some embodiments, the bias series is smoothened. A pairwise bias provides the difference of the data values between that of the given satellite and another satellite, for instance, if satellite 1 is identified as one with the finest spatial resolution, then between satellite 2 and satellite with $SR_{Min}$ (satellite 1 in this example). Pairwise biases are computed or determined for all satellites relative to the satellite with $SR_{Min}$. For instance, between satellite N and satellite with $SR_{Min}$ (satellite 1 in this example) as well. In some embodiments, pairwise bias computation is performed for all data in the time series data. Subsequent to the pairwise bias computation and correction, the resulting time series is smoothened by a technique such as the moving average. The pairwise bias, for example, is used to correct a satellite's data with respect to the satellite with the finest spatial resolution.

At 216, based on the minimal spatial resolution received at 212, it is determined as to whether the finest spatial resolution-$SR_{Min}$ satellite is present. For example, if Sentinel (SR=10/20 m for visible spectrum bands), Landsat (SR=30 m), and MODIS (SR=250 m) satellites are considered, then of the three Sentinel has the finest spatial resolution of 10-20 m (depending on the band considered). At 216, it is determined whether the satellite data with spatial resolution $SR_{Min}$, in this example, Sentinel data is present, for example, in a given day in a given pixel of the image.

At 216, responsive to determining that the satellite (e.g., satellite 1) with spatial resolution data of $SR_{Min}$, that is, the finest spatial resolution-$SR_{Min}$ is present, at 220 the vegetation index is set to that of the finest spatial resolution $SR_{Min}$ satellite, in this example, satellite 1.

At 216, responsive to determining that the finest spatial resolution-$SR_{Min}$ satellite data is not present, at 218, the next available minimum spatial resolution satellite is determined. For instance, if Sentinel data is absent, then it is checked whether Landsat data is present as it is the satellite with the next minimum spatial resolution. Once the next available minimum spatial resolution satellite is identified, the logic of the method proceeds to 220.

At 220, a vegetation index (VI) is set to be the value of the finest spatial resolution $SR_{Min}$ satellite VI, if at 216 it was determined that the finest spatial resolution-$SR_{Min}$ is present. Otherwise, a vegetation index (VI) is set to that of the bias corrected value from next available minimum spatial resolution satellite identified at 218. For instance, one method to determine the bias is the pairwise difference of vegetation index (VI) values from satellite with $SR>SR_{Min}$. This corresponding bias value is added to the satellite data with next minimum spatial resolution. Thus, for example, the pairwise bias corrects a satellite's data with respect to the satellite with the finest spatial resolution. If data is not found in any of the satellites being considered, the vegetation index (VI) is set to no value (e.g., empty pixel value).

The processing performed for each pixel, for example, at 214-224, creates an NDVI series. At 222, artificial jumps in data (NDVI series) is fixed. For instance, by fixing a threshold by which the data can change over consecutive days (e.g., 2 or 3 days, or another configured number of days), all changes or jumps greater than the threshold are identified as artificial jumps. Such values may be removed, and interpolation performed between values before and after the artificial jumps.

At 224, the data resulting from the processing at 222 is interpolated to render the resolution to a desired temporal resolution, e.g., daily. The desired temporal resolution may be configured to that of the satellite with the highest (finest but minimum in value) temporal resolution or daily. The interpolation at 224 may correct the following scenarios in the data resulting at 220. Firstly, the satellite data chosen, be it that of minimum (finest but minimum in value) spatial resolution (SR) or next available minimum SR may have missing data due to clouds or sensor anomaly. Secondly, the finest spatial resolution satellite data chosen may have temporal resolution lower than the highest (finest but minimum in value) temporal resolution, e.g., daily resolution. If the satellite data chosen has valid values at daily resolution, this step may be skipped. The method shown may be performed for each pixel of the image, for example, for the time series of images. For instance, the processing at 214-224 may be repeated for each pixel of the image. A pixel may be kept empty, if no satellite is found to have data corresponding to the minimum SR for the entire period being considered.

At 226, the interpolated data output at 224 is the high definition (finest spatial and temporal resolution) vegetation index series.

At 228, a target image comprising pixels represented by the high definition (finest spatial and temporal resolution) vegetation indices, for example, determined according to the method described above, may be generated, and/or provided.

Figure 3:
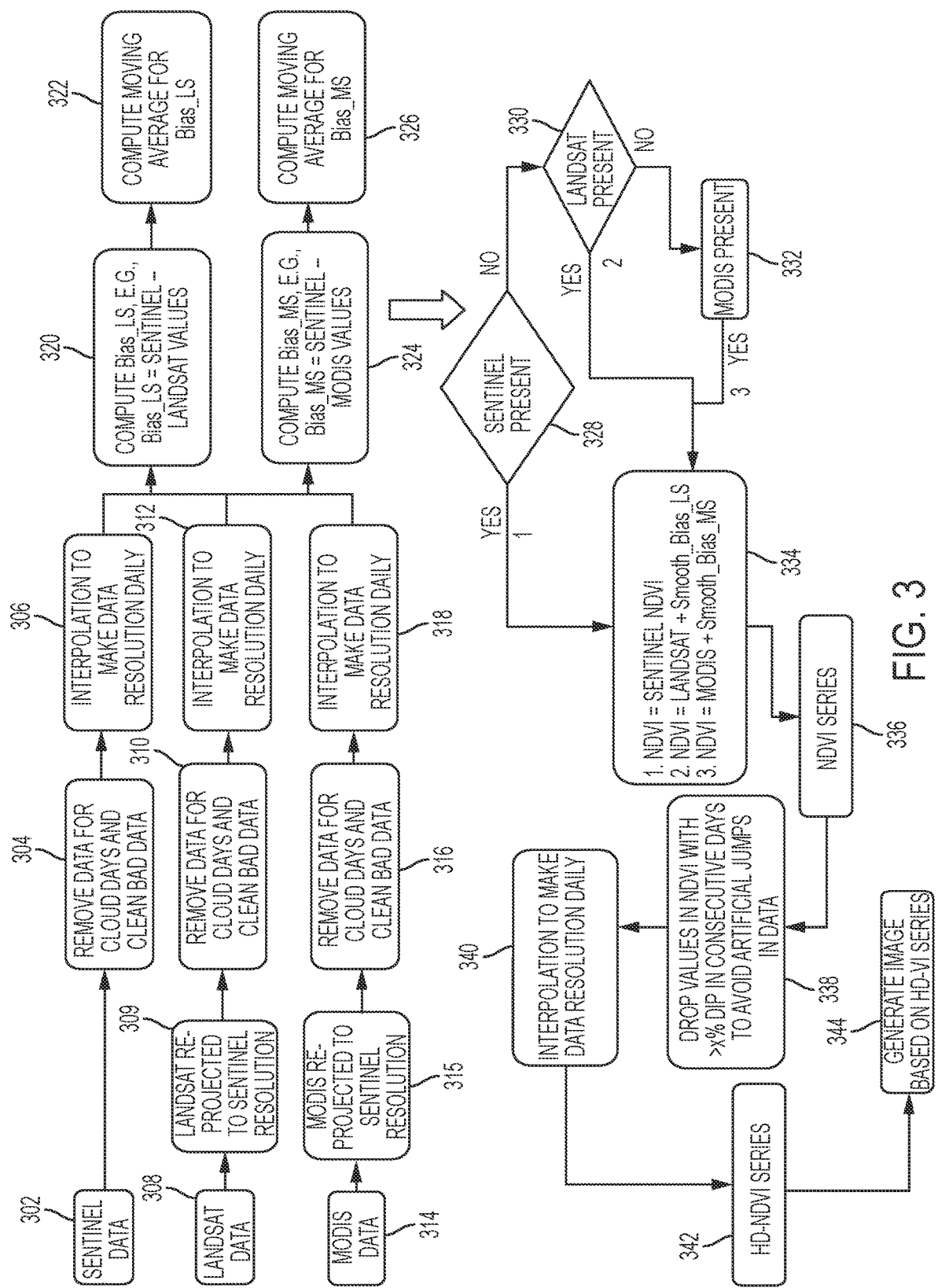
FIG. 3 is a diagram illustrating a method of generating high definition normalized difference vegetation index (HD-NDVI) data in one embodiment.

FIG. 3 is a diagram illustrating a method of generating an HD-NDVI data in one embodiment. Data from different satellites 302, 308 and 314 may be processed as follows. As an example, consider that an example of a satellite (e.g., referred to as a first satellite for explanation sake only) is Sentinel, an example of another satellite (e.g., referred to as a second satellite for explanation sake only) is Landsat, and an example of yet another satellite (e.g., referred to as a third satellite for explanation sake only) is MODIS. Consider that the first satellite (e.g., Sentinel) has the finest or minimum spatial resolution ($SR_{Min}$) data. At 309, the data of the second satellite may be re-projected to the resolution of the first satellite's data. At 315, the data of the third satellite may be re-projected to the resolution of the first satellite's data.

At 304, data 302 from a satellite or a group of satellites such as Sentinel may be processed to cleanse the data 302, for instance, remove data associated with cloudy days and other data noise, which may affect the accuracy of the HD-NDVI computation. At 306, the cleansed data from 304 is interpolated to generate data of a desired or predetermined temporal resolution, for example, daily resolution.

Similarly, at 310, another satellite data (also referred to as data from a second satellite), for example, re-projected Landsat data 309 is processed to cleanse the data, for instance, remove data associated with cloudy days and filter out other noise data, which may affect the accuracy of the HD-NDVI computation. At 312, the cleansed data from 310 is interpolated to generate data of a desired or predetermined temporal resolution, for example, daily resolution, or for example, another highest (finest but minimum in value) temporal resolution.

Likewise, at 314, yet another satellite data (also referred to as data from a third satellite), for example, MODIS data, re-projected at 315, is processed to cleanse the re-projected data, for instance, remove data associated with cloudy days and filter out other noise data, which may affect the accuracy of the HD-NDVI computation. At 318, the cleansed data from 316 is interpolated to generate data of a desired or predetermined temporal resolution, for example, daily resolution, or for example, another highest (finest but minimum in value) temporal resolution.

At 320, a bias between data from the first satellite (satellite with minimum SR) and the second satellite is determined. For example, bias of second satellite=first satellite values (with $SR_{Min}$)−second satellite values. For instance, bias_LS=Sentinel−Landsat values. At 322, a moving average for bias of satellite, e.g., bias_LS is determined. The moving average can be computed by averaging the bias_LS over a window of 'M' days. The window is moving because with the progression of each day in this example, the first day bias_LS is dropped and the current day bias_LS is appended to the time series, hence the name moving average. The window size, for example, 'M', may be configurable. In one aspect, a time window size may be selected such that at least 1 actual data point (and not the interpolated data point) appears in the sub-selected time series for moving average.

At 324, bias between data from the first satellite and the third satellite is determined. For instance, bias of third satellite=first satellite (with minimum SR) values−third satellite values. For example, bias_MS=Sentinel−MODIS values. At 326, a moving average for bias of third satellite, e.g., bias_MS is determined.

At 328, it is determined as to whether the data of the minimum SR satellite (the satellite with minimum SR), in this example, first satellite or Sentinel is present. Responsive to determining that there is a presence of minimum SR satellite data (in this example, first satellite or Sentinel), NDVI is set as the first satellite's NDVI at 334.

At 328, responsive to determining that the minimum spatial resolution satellite data (in this example, first satellite or Sentinel) is absent, at 330, it is determined as to whether the data of the satellite with next minimum SR, e.g., the second satellite or Landsat, is present. Responsive to determining the presence of the next minimum available SR satellite data, at 334, NDVI is set to NDVI of the satellite with next minimum SR plus the bias computed relative to the satellite with minimum resolution. It may be that for the day of interest, the satellite with minimum SR may be absent. Thus, the historical data sub-window (e.g., 'M') is set to a period in the past so that there occurs at least one day on which the minimum SR satellite data is present to enable calculation of bias between the satellite with SR>$SR_{Min}$ and satellite with SR=$SR_{Min}$.

At 330, responsive to determining that the satellite with the next minimum SR is also not present, at 332, it is determined whether the third satellite, e.g., MODIS data is present. Responsive to determining a presence of the third satellite's data, at 334, NDVI is set as the third satellite's NDVI plus the bias of the third satellite relative to satellite with minimum SR. The method shown may be performed for each pixel of the image data. For instance, the processing shown at 320-334 may be repeated for each pixel of the image data, for example, for all data in the time series for that pixel.

NDVI series 336 is the output of the processing shown at 320 through 334. The processing is performed for each pixel of satellite imagery being considered.

At 338, the values in NDVI which are greater than a threshold (x) percentage (%) change in consecutive days are dropped or filtered out, in order to avoid artificial jumps in data. For instance, it is practically not possible for the NDVI values to increase and decrease by 50% in y consecutive days (a number of consecutive days, for example, y=2, e.g., 2 consecutive days). In this example, the threshold is set at 50% and all the values that show this jump is categorized as artificial jumps and removed from the time series. Other criterion or functions may also be used to filter jumps in data.

At 340, the remaining NDVI data (after artificial jumps are filtered), is interpolated to render the NDVI data to the desired or predetermined resolution, for example, daily or another time interval resolution.

At 342, the interpolated data makes up an HD-NDVI data series. At 344, a target image comprising pixels with High Definition Normalized Difference Vegetation Index is generated.

Figure 4:
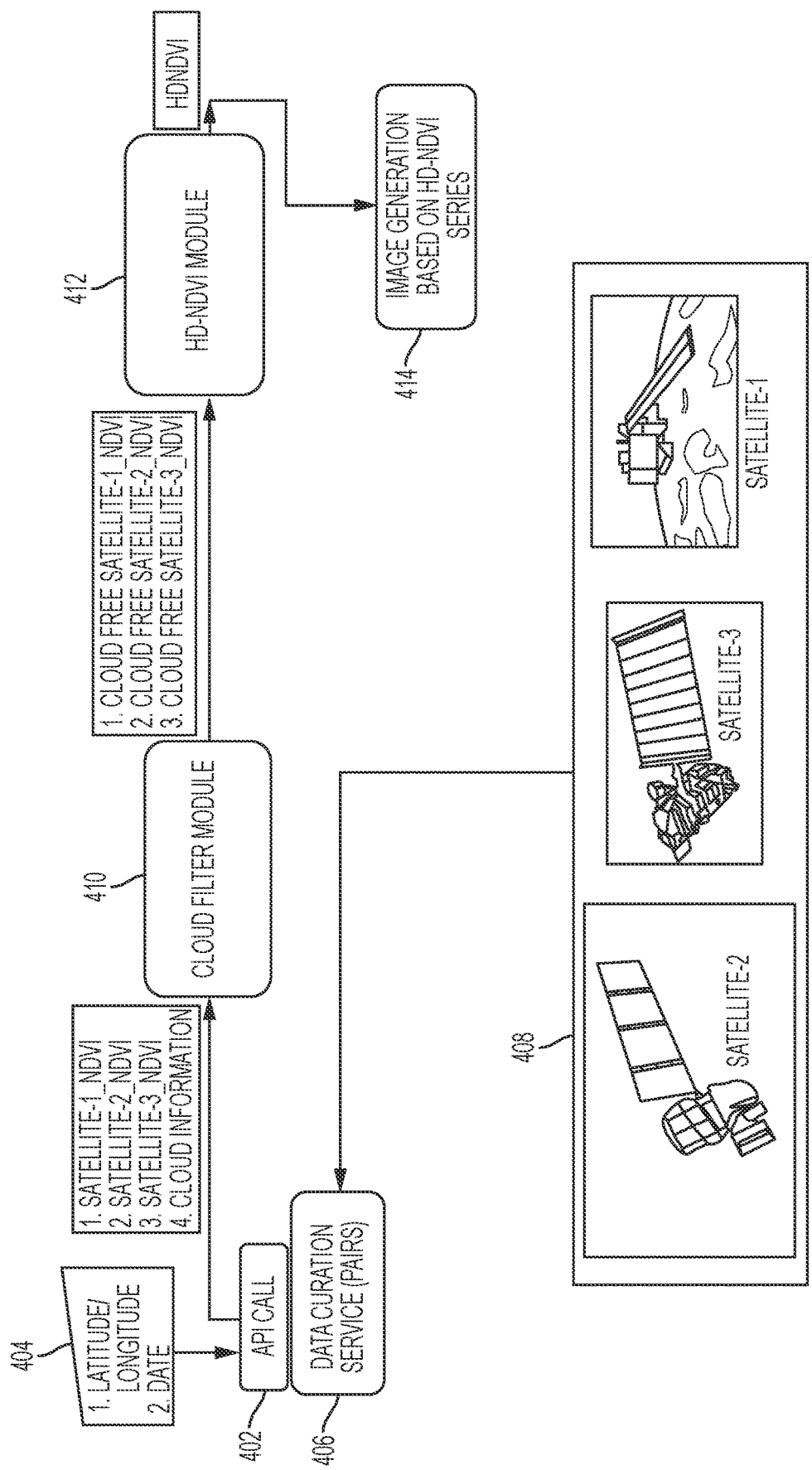
FIG. 4 is a diagram illustrating an embodiment of a use case.

FIG. 4 illustrates an embodiment of a use case. The methodology of the present disclosure in some embodiments may be initiated with an application programming interface (API) call 402. For instance, an API call may be implemented and provided which can invoke or trigger the execution of a method in one embodiment. In some embodiments, the API takes input parameters 404 which may include geographic location data of a target region being assessed such as latitude and longitude specification, and date range for which the assessment is to be performed The API call connects or invokes a data curation service 406, via which satellite data can be obtained, associated with the target region and the date range. Data curation service 406 refers to any system or apparatus which stores georeferenced and co-registered data from multiple satellites 408 so that data can be accessed by the HD-NDVI module of the present disclosure in a consistent way. At 410, a cloud filter module or functionality is invoked with the data received from the satellites, for example, NDVI data taken from a plurality of satellites (e.g., Sentinel NDVI, Landsat NDVI, MODIS NDVI) and cloud information. The cloud filter module filters data to remove cloud data and other data noise data. The cloud filter module refers to any general methodology or algorithm which can be used to identify pixels in satellite data with cloud cover/noise data present. Responsive to identifying such pixels, those pixels can be removed or corrected to reduce their impact on the final blending algorithm. At 412, the HD-NDVI module is invoked with the filtered (e.g., cloud free) NDVI data from the satellites. The HD-NDVI module generates HD-NDVI data, for example, as described above with reference to FIG. 3. At 414, a target image may be generated that comprises pixels represented by the HD-NDVI.

The methodology of the present disclosure in an embodiment provides for a flexible spatiotemporal method for fusing satellite images with different resolutions and an enhanced spatio-temporal fusion method for blending satellite (e.g., Sentinel, Landsat and MODIS) data (e.g., to synthesize Sentinel-like imagery at the temporal resolution of MODIS, i.e., daily). The methodology of the present disclosure in some embodiments can handle blending of more than 2 satellite images at a time and provides for high spatial and temporal resolution (finest but minimum in value) forecasts, for instance, even for the days when both low (coarser but higher in value) resolution and high (finer but smaller in value) resolution satellite images are absent.

Figure 5:
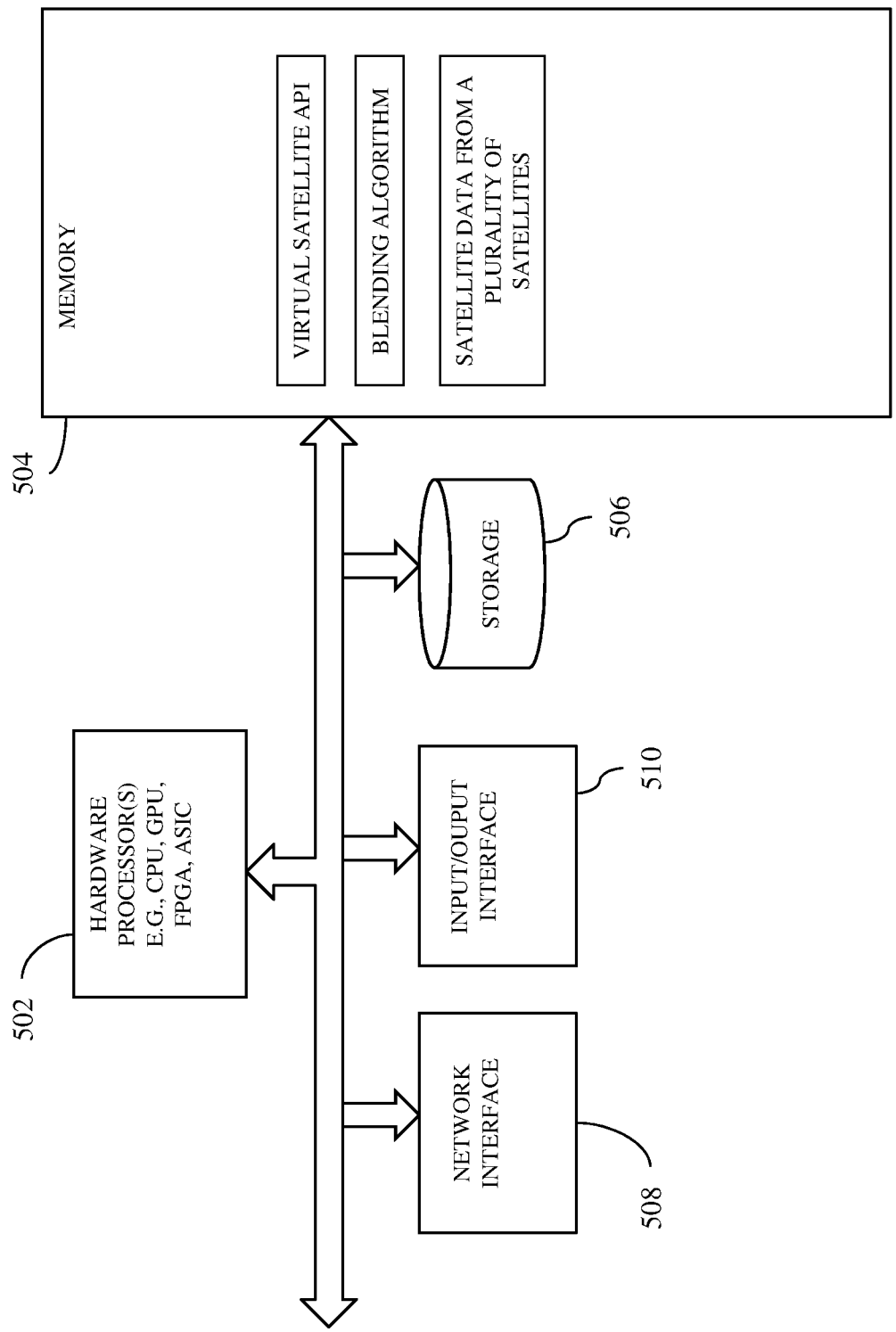
FIG. 5 is a diagram showing components of a system in one embodiment, which for example, generates a virtual satellite that can produce HD-NDVI based on satellite data taken by a plurality of satellites.

The methods described above may be executed on or by a processor, which may be coupled with a memory device, for example, as shown in FIG. 5. FIG. 5 is a diagram showing components of a system in one embodiment, which for example, functions as a virtual satellite that can generate HD-NDVI based on satellite data taken by a plurality of satellites, for example, more than two satellites. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and generate an HD-NDVI series. The memory device 504 may include random access memory (RAM), read-only memory (ROM) or another memory device, and may store data and/or processor instructions for implementing various functionalities associated with the methods and/or systems described herein, for example, a virtual satellite API and functionalities associated with generating an HD-NDVI time series. The processor may execute computer instructions stored in the memory or received from another computer device or medium. The memory device 504 may, for example, store instructions and/or data for functioning of one or more hardware processors 502 and may include an operating system and other program of instructions and/or data. One or more hardware processors 502 may receive input comprising satellite data from a plurality of satellites. For instance, at least one hardware processor 502 may generate a time series data comprising HD-NDVI as described above. In one aspect, input data may be stored in a storage device 506 or received via a network interface 508 from a remote device and may be temporarily loaded into the memory device 504 for building or generating the HD-NDVI time series. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

An application programming interface, for instance, may execute on one or more of the hardware processors 502, the application programming interface responsive to being invoked triggering the hardware processor to perform the following functions, e.g., receive georeferenced data representing an image of a geographic region from a plurality of different satellites, identify the satellite with the minimum spatial resolution, perform spatial re-projection of data all satellites that have spatial resolution greater than the minimum (finest but minimum in value) spatial resolution, remove cloud data from the re-projected data, interpolate the re-projected data to a desired temporal resolution, determine bias in the re-projected and cleaned data between the plurality of satellites, determine whether the minimum spatial resolution first satellite data is present. Responsive to finding that the minimum spatial resolution first satellite data is present, one or more of the hardware processors 502 may set vegetation index data to first satellite's vegetation index data, and responsive to finding that the minimum spatial resolution satellite data is absent and the next minimum spatial resolution second satellite data is present, one or more of the hardware processors 502 may set vegetation index data to second satellite's vegetation index data adjusted by the bias. Adjusting by the bias may include summing the vegetation index data with the bias data. One or more of the hardware processors 502 may determine the bias, determine whether the minimum spatial resolution data is present, and set the vegetation index data, for each of the pixels of the image. One or more of the hardware processors 502 may generate a target image comprising pixels represented by the set vegetation index data.

In aspects, a virtual satellite apparatus and method may be provided which corrects data anomalies of remote sensed data and enhances temporal and spatial resolution, for instance, to estimate high (finest) spatio-temporal resolution vegetation indices termed as High Definition Vegetation Index (HD-VI). In one aspect, a virtual satellite may include a hardware processor on which the proposed blending algorithm may reside coupled with a communication interface and a memory coupled to the hardware processor. An application programming interface may execute on the hardware processor, the application programming interface responsive to being invoked may trigger the hardware processor to receive georeferenced and co-registered data representing current and past images corresponding to a historical time window of 'H' days of a geographic region from a plurality of different satellites. The blending algorithm, for example, executing on a hardware processor, may identify the satellite with the minimum spatial resolution referred to as the first satellite. In one aspect, if there are multiple satellites with minimum (finest but minimum in value) spatial resolution, then the one with highest (finest but minimum in value) temporal resolution is selected. Satellites arranged in decreasing order of spatial resolution may be referred to as first satellite, second satellite, third satellite, and so on.

The data of all the satellites from the plurality of satellites which have spatial resolution greater than that of the first satellite (one with the minimum spatial resolution of the plurality of satellites), i.e., the second, third and so on up to the n-th (the total number of satellites considered for blending) are re-projected in the spatial domain to the resolution of that of the first satellite. For instance, all the satellites with spatial resolution greater than minimum spatial resolution (first satellite spatial resolution) are re-projected to minimum spatial resolution. This spatial reprojection is done for all 'H' days of historic data downloaded, for example, on hardware processor. Further to the reprojection, the blending algorithm residing in the hardware processor may also remove cloud data from the re-projected georeferenced and co-registered satellite data and interpolate the georeferenced and co-registered data to a desired temporal resolution. The blending algorithm may also determine pairwise bias between the first satellite and each one of the remaining plurality of satellites, i.e., bias between second and first, third and first, and so on till $n^{th}$ and first satellite. This pairwise bias is computed for all the days in the historical time window of 'H' days for which the images of the plurality of satellites are obtained and the blending algorithm may further smoothen the pairwise biases so computed.

Subsequent to bias determination and smoothing, for any day, i.e., 'T' day for which the high (finest but minimum in value) spatio-temporal vegetation index is determined, the blending algorithm may further determine whether the minimum (finest but minimum in value) spatial resolution first satellite georeferenced data is present. Here 'T' day is one of the days in 'H' days. If not, then the vegetation index values may be estimated as a function, e.g., median or mean of recent past vegetation index data. For '$T^{th}$' day in 'H' days, responsive to finding that the minimum spatial resolution first satellite georeferenced data is present for the '$T^{th}$' day, the blending algorithm may set vegetation index data to first satellite's (the one with minimum spatial resolution) vegetation index data. Responsive to finding that the first satellite data with minimum spatial resolution is absent (that is, no first satellite's data for that '$T^{th}$' day), and responsive to finding that the second satellite (next minimum spatial resolution) data that has been re-projected to spatial resolution of first satellite (minimum spatial resolution) is present in the plurality of satellites, the blending algorithm may set vegetation index data to that of the second satellite's vegetation index data adjusted by the pairwise smoothened bias computed between the second and first satellite. In this manner, the blending algorithm selects the satellite with the minimum spatial resolution (can be second if present or third if first and second satellites are absent and so on) and uses the vegetation index adjusted with the smoothened bias computed between the selected satellite and the first satellite. In one aspect, the blending algorithm may determine the bias, determine the minimum spatial resolution satellite data present, and sets the vegetation index data, for each of the pixels of the image. The blending algorithm may further generate a target image comprising pixels represented by the set vegetation index data or smooth the time series of vegetation index thus generated before selecting for required day and writing to target image.

A virtual satellite system, for example, may include a hardware processor coupled with a communication interface, a memory coupled to the hardware processor. The hardware processor may execute a blending algorithm, which may execute on the hardware processor. An application programming interface may be executing on the hardware processor, the application programming interface responsive to being invoked triggering the blending algorithm, which for example, performs the following. The current and past data, for example, georeferenced and co-registered data corresponding to a historical time window, representing an image of a geographic region may be received from a plurality of different satellites. A satellite is identified that has the minimum of the spatial resolutions of all the plurality of satellites considered. The satellite identified as having the minimum of the spatial resolutions is referred to as a first satellite for explanation sake. If there are multiple satellites with minimum spatial resolutions, a satellite with minimum temporal resolution is identified, which satellite is then referred to as the first satellite (for explanation purposes only).

In some embodiments, all of the georeferenced and co-registered data of all the satellites are re-projected except the data of the first satellite to the spatial resolution of the first satellite, that is to the minimum (finest but minimum in value) spatial resolution. Cloud data and other anomalous data due to sensor saturation, if any, defective pixel may be removed from the georeferenced and co-registered data of the first satellite and from the re-projected georeferenced and co-registered data of remaining satellites.

The data (e.g., georeferenced and co-registered data) is interpolated to a desired temporal resolution. Pairwise bias between the possibly interpolated and cloud and/or sensor anomaly corrected data of the first satellite and re-projected, possibly interpolated and cloud and/or sensor anomaly corrected data of each one of the plurality of satellites other than the first satellite is determined. The pairwise bias determination is performed for all the data in historical time window and a bias time series so obtained may be smoothened.

Considering a minimum spatial resolution, it is determined whether the first satellite data is present. Responsive to finding that the first satellite data is present, vegetation index data is interpolated to the desired temporal resolution and is set to first satellite's vegetation index data. Responsive to finding that the first satellite is absent, and responsive to finding that the next minimum spatial resolution satellite data is present amongst the plurality of satellites considered, the vegetation index data is set to that of next minimum spatial resolution satellite's vegetation index data adjusted by the bias estimated between the next satellite's vegetation index data and the first satellite's vegetation index data. In one aspect, the blending algorithm executing on the hardware processor, for each of the pixels of the image, determines the bias, determines whether the minimum spatial resolution satellite data (the first satellite data) is present, and if the first satellite data is not present, then selects the next minimum spatial resolution satellite data, interpolates it to the desired temporal resolution, corrects it with the bias determined between the first satellite and the selected satellite, sets the vegetation index data of the selected satellite. A target image comprising pixels represented by the set vegetation index data is generated.

In some embodiments, the next (e.g., second) satellite's vegetation index data adjusted by the bias includes a sum of the second satellite's vegetation index data and the bias between the interpolated and cloud and/or sensor anomaly corrected first and spatially re-projected, interpolated and cloud and/or sensor anomaly corrected next (e.g., second) satellite data.

In some embodiments, the desired temporal resolution is a programmable parameter and can be daily resolution or any other desired temporal resolution. The vegetation index can be estimated even for dates when satellite 1, satellite 2 and others may not be present. In some embodiments, the blending algorithm executing on the hardware processor further drops values, in the set vegetation index data, with greater than a threshold percentage dip or change in consecutive days. In some embodiments, the blending algorithm executing on the hardware processor further interpolates the set vegetation index data after dropping the values to the desired temporal resolution, wherein the target image is generated based on the further interpolated vegetation index data.

Figure 6:
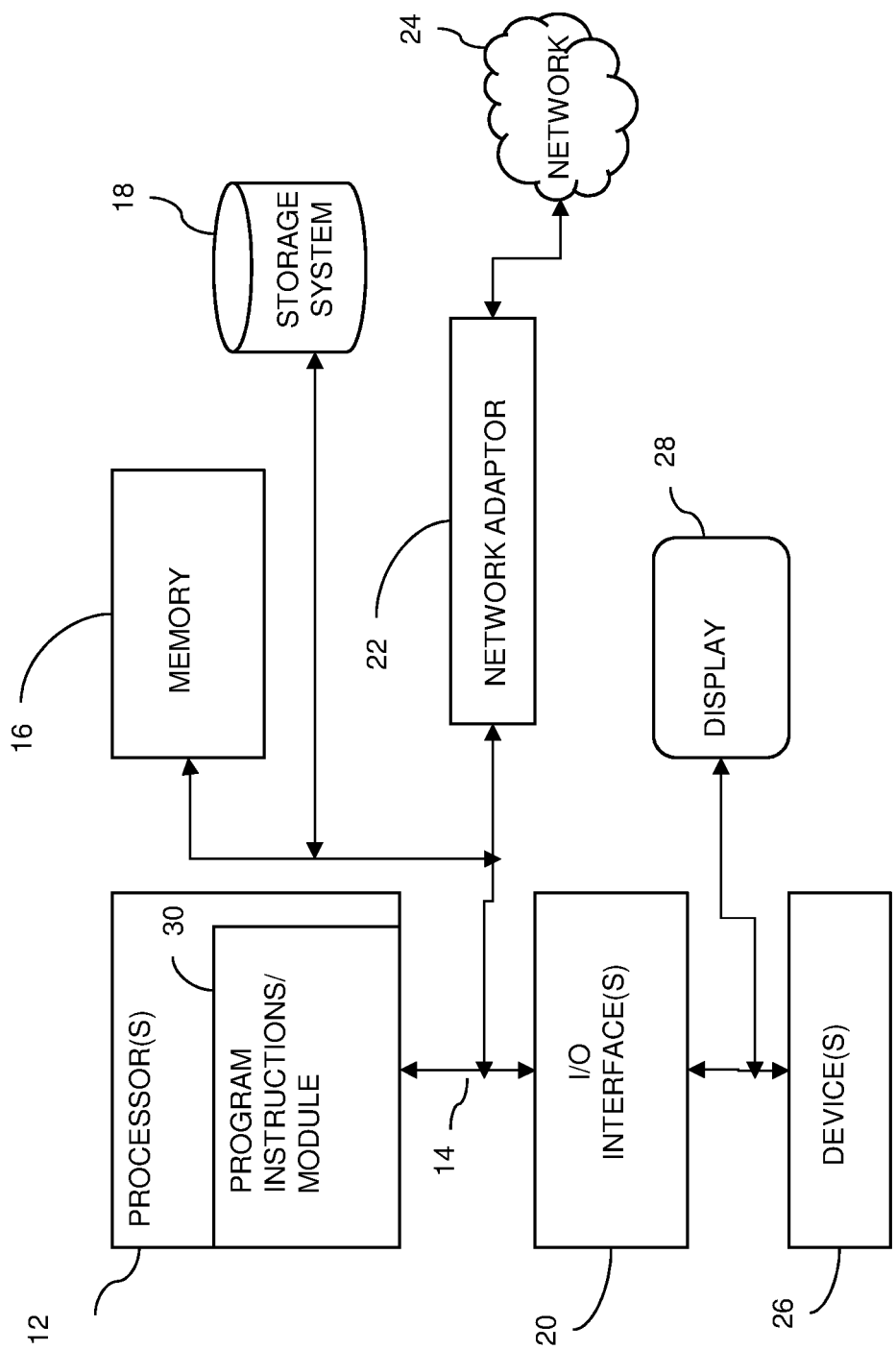
FIG. 6 illustrates a schematic of an example computer or processing system that may implement a system according to one embodiment.

FIG. 6 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A virtual satellite system, comprising:
a hardware processor; and
a memory coupled to the hardware processor;
the hardware processor configured to:
receive data corresponding to a time series of images of a geographic region from a plurality of satellites;
identify a first satellite that has a minimum of spatial resolutions of the plurality of satellites;
re-project the data of the plurality of satellites except the first satellite to the minimum spatial resolution identified in the first satellite;
remove cloud data, if present, from the data of the first satellite and from the re-projected data of remaining satellites of the plurality of the satellites;
interpolate the data of the first satellite and the re-projected data of the remaining satellites to a desired temporal resolution, for the data not already having the desired temporal resolution;
determine pairwise bias between the data of the first satellite and the re-projected data of each one of the remaining satellites, wherein a bias time series is generated;
determine whether the first satellite data is present for a given time corresponding to the desired temporal resolution;
responsive to finding that the first satellite data is present, set vegetation index data to the first satellite's data;
responsive to finding that the first satellite data is absent, and responsive to finding that a next minimum spatial resolution satellite data is present among the remaining satellites, set vegetation index data to a next minimum spatial resolution satellite's data adjusted by the bias estimated between the next minimum spatial resolution satellite's data and the first satellite's data; and
generate a target image comprising pixels represented by the set vegetation index data.

2. The system of claim 1, wherein the hardware processor is further configured to remove anomalous data due to at least one of sensor saturation and defective pixel, from the data of first satellite and from the re-projected data of the remaining satellites.

3. The system of claim 1, wherein the data comprises georeferenced and co-registered data.

4. The system of claim 1, wherein the next minimum spatial resolution satellite's data adjusted by the bias comprises a sum of the next satellite's data and the bias estimated between the interpolated and cloud corrected first satellite data and spatially re-projected, interpolated and cloud corrected next satellite data.

5. The system of claim 1, wherein the desired temporal resolution is programmed as a minimum of temporal resolutions of the plurality of satellites.

6. The system of claim 1, wherein the vegetation index is estimated even for time the plurality of satellites are not present to produce the image for the geographic region.

7. The system of claim 1, wherein the hardware processor is further configured to drop values, in the set vegetation index data, with greater than a threshold percentage change in a threshold number of consecutive days.

8. The system of claim 7, wherein the hardware processor is further configured to interpolate the set vegetation index data after dropping the values to the desired temporal resolution, wherein the target image is generated based on the further interpolated vegetation index data.

9. The system of claim 1, wherein the plurality of satellites comprises more than two satellites.

10. A computer-implemented method, comprising:
receiving data corresponding to a time series of images of a geographic region from a plurality of satellites;
identifying a first satellite that has a minimum of the spatial resolutions of the plurality of satellites;
re-projecting the data of the plurality of satellites except the first satellite to the minimum spatial resolution identified in the first satellite;
removing cloud data, if present, from the data of the first satellite and from the re-projected data of remaining satellites of the plurality of the satellites;
determining pairwise bias between the data of the first satellite and the re-projected data of each one of the remaining satellites, wherein a bias time series is generated;
determining whether the first satellite data is present for a given time corresponding to a desired temporal resolution;
responsive to finding that the first satellite data is present, setting vegetation index data to first satellite's vegetation index data,
responsive to finding that the first satellite data is absent, and responsive to finding that a next minimum spatial resolution satellite data is present among the remaining satellites, setting vegetation index data to a next minimum spatial resolution satellite's data adjusted by the bias estimated between the next minimum spatial resolution satellite's data and the first satellite's data,
wherein the determining the pairwise bias, determining whether the first satellite data is present, and setting the vegetation index data are performed for each of the pixels of the time series of images; and
generating a target image comprising pixels represented by the set vegetation index data.

11. The method of claim 10, wherein the next minimum spatial resolution satellite's data adjusted by the bias comprises a sum of the next satellite's data and the bias estimated between the first satellite data and spatially re-projected next satellite data.

12. The method of claim 10, further including interpolating the data of the first satellite and the re-projected data of the remaining satellites to the desired temporal resolution, for the data not already having the desired temporal resolution, wherein the desired temporal resolution is programmed as a minimum of temporal resolutions of the plurality of satellites.

13. The method of claim 10, further comprising dropping values, in the set vegetation index data, with greater than a threshold percentage change in a threshold number of consecutive days.

14. The method of claim 13, wherein further comprising interpolating the set vegetation index data after dropping the values to a desired temporal resolution, wherein the target image is generated based on the further interpolated vegetation index data.

15. The method of claim 1, wherein the plurality of satellites comprises more than two satellites.

16. A computer program product comprising a non-transitory computer readable storage medium having program instructions embodied therewith, the program instructions readable by a device to cause the device to:
receive data corresponding to a time series of images of a geographic region from a plurality of satellites;
identify a first satellite that has a minimum of spatial resolutions of the plurality of satellites;

re-project the data of the plurality of satellites except the first satellite to the minimum spatial resolution identified in the first satellite;

remove cloud data, if present, from the data of the first satellite and from the re-projected data of remaining satellites of the plurality of the satellites;

interpolate the data of the first satellite and the re-projected data of the remaining satellites to a desired temporal resolution, for the data not already having the desired temporal resolution;

determine pairwise bias between the data of the first satellite and the re-projected data of each one of the remaining satellites, wherein a bias time series is generated;

determine whether the first satellite data is present for a given time corresponding to the desired temporal resolution;

responsive to finding that the first satellite data is present, set vegetation index data to the first satellite's data;

responsive to finding that the first satellite data is absent, and responsive to finding that a next minimum spatial resolution satellite data is present among the remaining satellites, set vegetation index data to a next minimum spatial resolution satellite's data adjusted by the bias estimated between the next minimum spatial resolution satellite's data and the first satellite's data; and generate a target image comprising pixels represented by the set vegetation index data.

17. The computer program product of claim 16, wherein the next minimum spatial resolution satellite's data adjusted by the bias comprises a sum of the next satellite's data and the bias estimated between the first satellite data and spatially re-projected next satellite data.

18. The computer program product of claim 16, wherein the desired temporal resolution is programmed as a minimum of temporal resolutions of the plurality of satellites.

19. The computer program product of claim 16, program product drop values, in the set vegetation index data, with greater than a threshold percentage change in a threshold number of consecutive days.

20. The computer program product of claim 18, program product interpolate the set vegetation index data after dropping the values to the desired temporal resolution, wherein the target image is generated based on the further interpolated vegetation index data.

\* \* \* \* \*